United States Patent [19]

Burrows

[11] 4,254,476
[45] Mar. 3, 1981

[54] ASSOCIATIVE PROCESSOR

[75] Inventor: James L. Burrows, Merrimack, N.H.

[73] Assignee: Sanders Associates, Inc., Nashua, N.H.

[21] Appl. No.: 51,468

[22] Filed: Jun. 25, 1979

[51] Int. Cl.³ .................... G11C 13/00; G06F 11/10
[52] U.S. Cl. .................................. 365/49; 307/238; 364/513; 371/10
[58] Field of Search .............. 365/49, 189; 307/238; 364/513; 371/10

[56] References Cited

U.S. PATENT DOCUMENTS

4,058,851  11/1977  Scheuneman .................... 371/10

Primary Examiner—Terrell W. Fears
Attorney, Agent, or Firm—Louis Etlinger; Joseph E. Funk

[57] ABSTRACT

An associative processor for searching data stored in memory to identify messages or other data containing operator selected keywords containing alpha-numeric or other characters is disclosed. The identified messages or other data are then transferred from the memory to an output device for review. The processor comprises a plurality of commercially available integrated circuit random access memories (RAMs) for performing processing functions. The binary words read out of the RAMs are applied via a register to the higher order addressing inputs of the same RAMs without any processing. Messages being searched for keywords are applied to the lower order addressing inputs of the same RAMs. A binary word applied to the higher order addressing inputs of the RAM memory selects a block of memory bits with each bit being associated with a different character. Only memory bits within a selected block of memory bits corresponding to keyword characters being searched for contain binary words indicating the block of bits for the subsequent keyword character to be searched for. When a character being searched for is detected, the binary word in the corresponding memory location is read out and applied to the higher order memory inputs via a register. This causes the next block of memory bits to be addressed to await receipt and detection of the next keyword character. After detecting all the characters of a keyword, an output is provided from the RAM memory which causes the stored message containing the selected keyword or words to be transferred to the output device for operator review.

5 Claims, 4 Drawing Figures

| RAMS 25 - 28 | | | | RAMS 30 | | | |
|---|---|---|---|---|---|---|---|
| MEMORY BLOCK | CHARACTER | MEMORY LOCATION | MEMORY CONTENTS | ADDRESS A3 | ADDRESS A4 | MEMORY BLOCK | MEMORY CONTENT |
| 1 | DELIMITER | 12 | 0101 | 0-000 | 0101 | 1 | 1 |
| 6 | F | 82 | 0001 | 0-101 | 0001 | 6 | 1 |
| 2 | I | 129 | 0001 | 0-001 | 0001 | 2 | 1 |
| 2 | I | 193 | 0001 | 0-001 | 0001 | 2 | 1 |
| 2 | 6 | 262 | 0001 | 0-001 | 0001 | 2 | 1 |
| 2 | DELIMITER | 12 | 0101 | 0-001 | 0101 | 2 | 1 |
| 6 | F | 82 | 0001 | 0-101 | 0001 | 6 | 1 |
| 2 | 5 | 133 | 1010 | 0-001 | 1010 | 2 | 1 |
| 3 | E | 209 | 0010 | 0-010 | 0010 | 3 | 1 |
| 3 | DELIMITER | 12 | 0101 | 0-010 | 0101 | 3 | 1 |
| 6 | E | 81 | 0100 | 0-101 | 0100 | 6 | 1 |
| 5 | C | 143 | 0100 | 0-100 | 0100 | 5 | 1 |
| 5 | M | 217 | 0100 | 0-100 | 0100 | 5 | 1 |
| 5 | 6 | 326 | 0100 | 0-100 | 0100 | 5 | 1 |
| 5 | DELIMITER | 12 | 0101 | 0-100 | 0101 | 5 | 1 |
| 6 | F | 82 | 0001 | 0-101 | 0001 | 6 | 1 |
| 2 | 4 | 132 | 1011 | 0-001 | 1011 | 2 | 1 |
| 4 | M | 281 | 0011 | 0-011 | 0011 | 4 | 1 |
| 4 | DELIMITER | 12 | 0101 | 0-011 | 0101 | 4 | 1 |
| 2 | F | 82 | 0001 | 0-101 | 0001 | 6 | 1 |
| 3 | C | 79 | 0100 | 0-001 | 0100 | 2 | 0 |
| 1 | DELIMITER | 12 | 0101 | 0-100 | 0101 | 5 | 1 |
| 2 | F | 82 | 0001 | 0-101 | 0001 | 6 | 1 |
| 3 | 4 | 132 | 1011 | 0-001 | 1011 | 2 | 1 |
| 4 | I | 193 | 0001 | 0-011 | 0001 | 4 | 0 |
| 1 | DELIMITER | 12 | 0101 | 0-001 | 0101 | 2 | 1 |

ASSOCIATIVE PROCESSOR

FIELD OF THE INVENTION

The present invention relates to data processing equipment and more particularly, to associative processors.

BACKGROUND OF THE INVENTION

Associative processors having content-addressable memories are special purpose computers typically used in conjunction with general purpose digital computers to handle tasks that are very time-consuming to the digital computer, but which can be handled efficiently by the associative processor. Thus, associative processors augment digital computers to provide more data processing throughput without complete system redesign. One application of associative processors, which is only one of the uses described herein, is to function with large capacity or bulk memories for document retrieval and file searching.

It is an object of this invention to provide an associative processor for document retrieval and file searching.

It is another object of this invention to provide an associative processor made up of commercially available random access memory (RAM) integrated circuits and utilizing little additional circuitry.

It is still another object of this invention to provide an associative processor that is used to locate any one of a specified group of words and/or characters, or to locate a specific sequence of words and/or alpha-numeric characters within stored messages and data.

SUMMARY OF THE INVENTION

According to a preferred embodiment of my invention, I provide an associative processor comprising two registers and a multiplicity of commercially available random access memory (RAM) integrated circuits, all but one of which have their addressing inputs interconnected in parallel. The outputs of each of two groups of RAMs are combined in parallel to form two busses, each of which is connected to a register which stores words read out in parallel format from the RAMs. The contents read out of a first one of the groups registers are looped around and connected to the higher order addressing inputs of both groups of RAMs thereby making them memory content addressable. The contents of another large capacity or bulk memory in which is stored messages or other data to be searched for keywords are applied via an appropriate interface to a buffer store and then applied to the parallel connected lower order addressing inputs of the two groups of RAMs. Multi-bit binary words are stored in the RAMs, with one bit of each word being in each RAM. The binary words stored in the RAMs depend upon the keyword or words to be searched for in the messages stored in bulk memory. Within the RAMs the first bit of each stored multi-bit binary word is stored within a particular bit position of the first RAM of each group, the second bit of the same multi-bit binary word is stored in the same bit position in the second RAM of each group, the third bit of the multi-bit binary word is stored in the same bit position of the third RAM of each group and so on. When an address made up of the higher order and lower order address bits is applied to the parallel interconnected inputs of the two groups of RAMs, the particular bit in each RAM is addressed and the multi-bit word stored in each group of RAMs is output in parallel from the RAMs onto the two busses respectively.

Initially, binary words comprising all zeros are stored in the two registers. Therefore, the higher order addressing inputs to all RAMs are all zeros. When the binary word for a character not being searched for in a keyword is applied to the lower order addressing inputs of the two groups of RAMs, the output from each RAM in the two groups still remains a zero. Thus, the contents of both registers remains all zeros. Upon the first character of a desired keyword being applied to the parallel connected lower order addressing inputs of the two groups of RAMs, there is a binary word having other than all zeros output from each of the two groups and stored in the register associated with each group. As briefly described heretofore, the binary words stored in the two registers are applied to the higher order addressing inputs of the RAMs. Upon the subsequent detection of a character, not the second character in the keyword, the output from the RAMs in each group returns to all zeros which causes the higher order addressing input bits to the RAMs to return to zero for the next received character. The processor thus recommences searching for the first character of the keyword being searched for. In the event that the second character of the keyword being searched for is applied to the lower order addressing inputs immediately following the first character, there will be another binary word output from the RAMs and input to the registers which prepares the RAMs to look for the third character in the keyword. As may be recognized, the binary number applied to the higher order addressing inputs of the RAMs necessarily defines a block or memory bits or locations, each memory location being assigned to one of a multiplicity of alpha-numeric or other characters that can be recognized by the processor. In this manner the processor performs a processing function normally performed by specialized aggregates of digital circuits in the manner usually associated with a class of data processing structures identified as finite state automata.

BRIEF DESCRIPTION OF DRAWINGS

The invention will be better understood upon reading the following detailed description in conjunction with the drawings in which.

DETAILED DESCRIPTION

Figure 1:
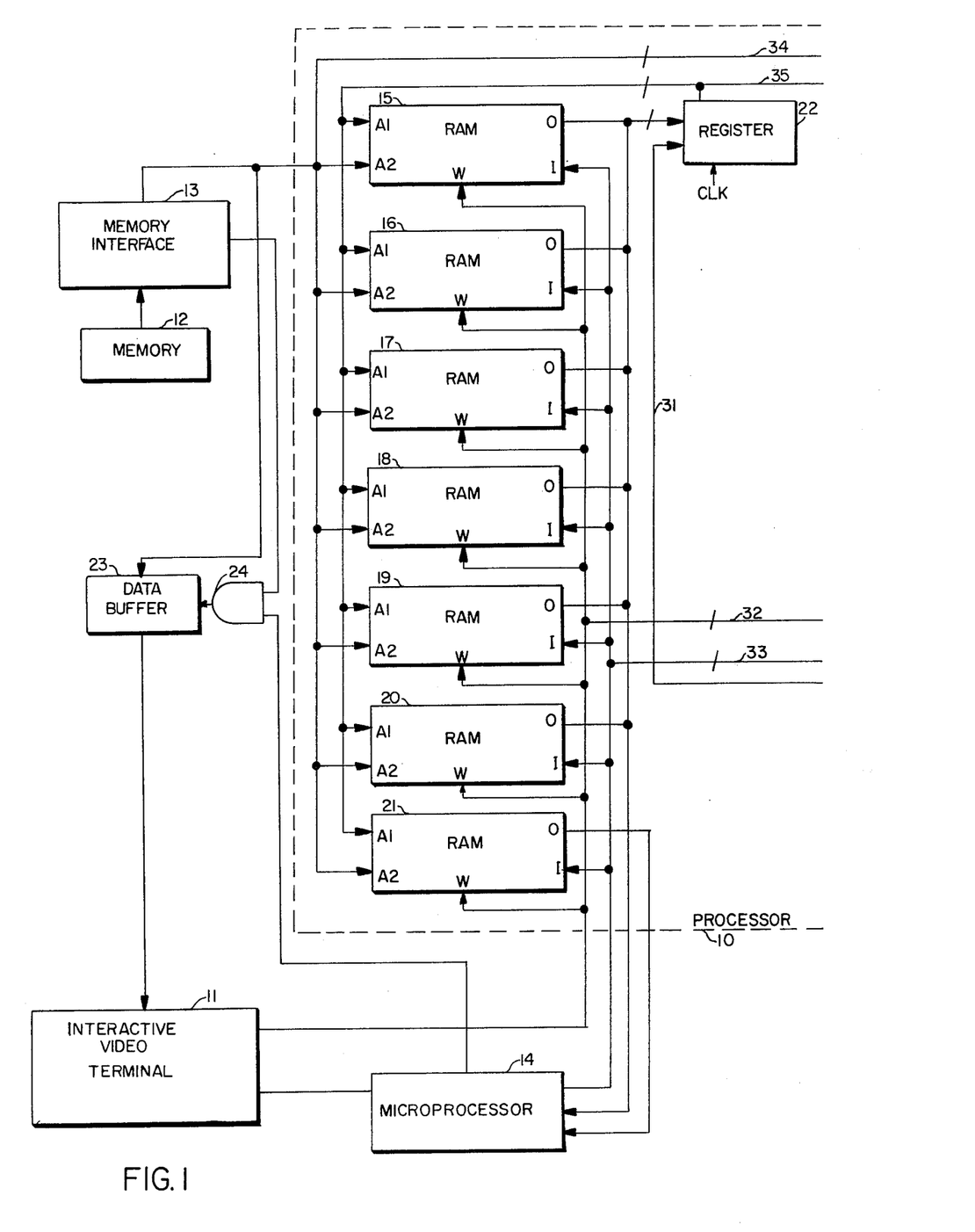
FIGS. 1 and 2 are a detailed block diagram of my novel data driven processor utilized to locate keywords within stored messages.
Figure 2:
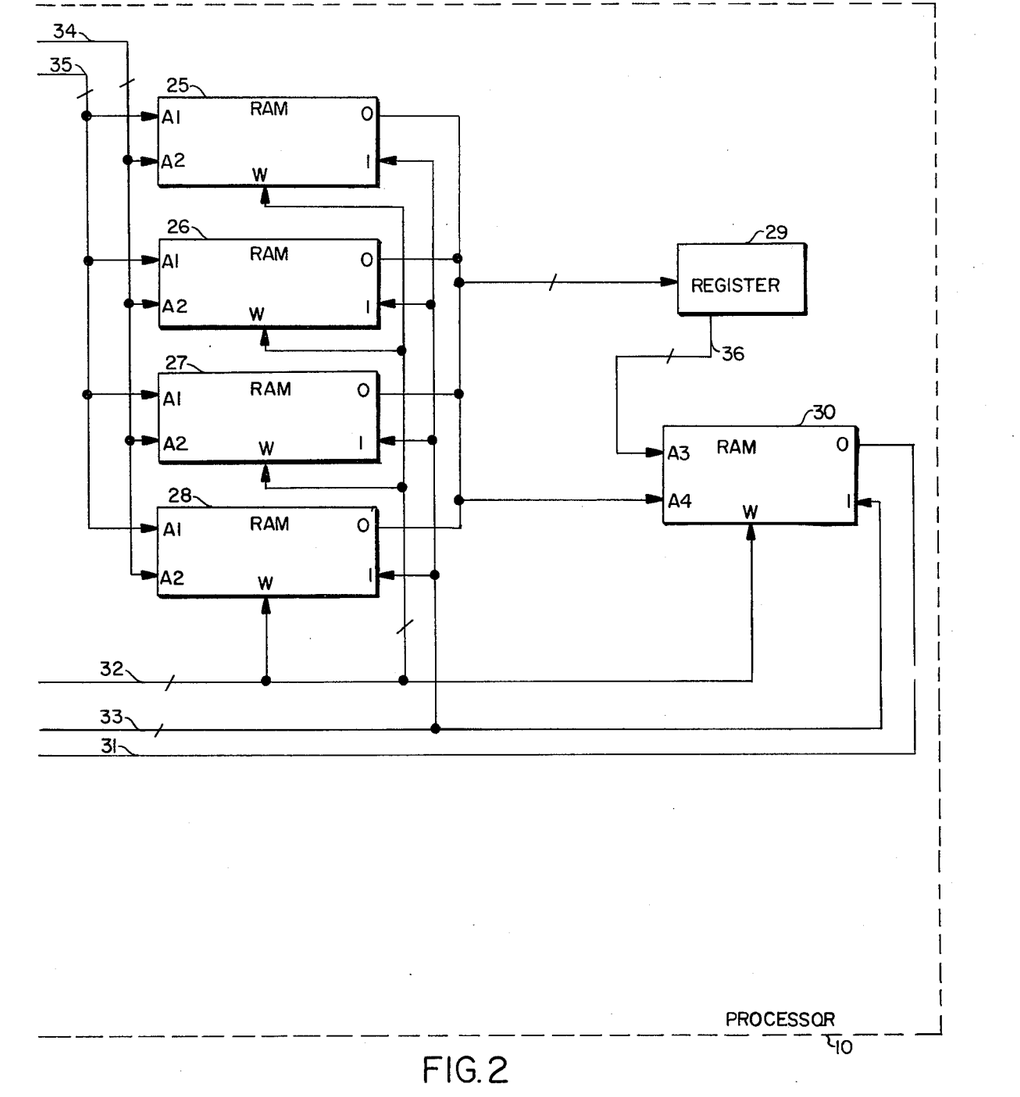
Figure 3:
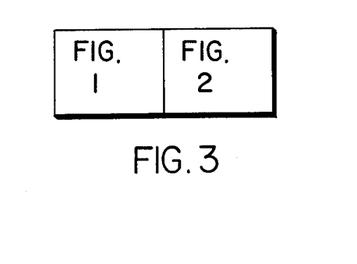
FIG. 3 shows the manner in which FIGS. 1 and 2 should be arranged when reading the Detailed Description.

Referring now to FIGS. 1 and 2, therein is shown my novel processor utilized by an operator having control via an interactive video terminal 11 to perform many functions including searching for operator selected keywords contained in messages stored in memory 12. Memory 12 is advantageously a relatively large capacity or bulk memory used to store a large quantity of randomly acquired and stored information to be later sorted or searched for specific information identifiable by keywords made up of alpha-numeric or other characters. Stored messages containing the selected keywords are identified and then transferred via data buffer 23 to terminal 11 and stored therein for display and review by the operator.

Initially, data or messages, which may be structured or unstructured, are stored in memory 12 via memory interface 13. The original source of the messages is not shown in FIG. 1 and is not part of this invention. The messages stored within memory 12 are to be searched for the presence of one or more individual keywords, or the presence of specified sequentially ordered keywords made up of alpha-numeric and/or other characters. These keywords are selected by the operator utilizing interactive video terminal 11. The operator inputs the keywords to the system via a device such as a keyboard (not shown) which is commonly part of an interactive video display terminal 11. Microprocessor 14 may be an integral part of terminal 11 as found in many intelligent terminals available on the commercial market, or the microprocessor 11 may be separate as shown in FIG. 1 for discussion purposes only. Microprocessor 14 is easily programmed by one skilled in the art to take the keyword characters input by the operator at terminal 11 and generate a binary word for each alpha-numeric or other character of the keyword(s) and cause same to be stored in an appropriate location of the associative processor 10 memory comprising RAMs 15 through 21. Other binary words reflecting each keyword are stored in appropriate locations of RAMs 25 through 28.

Before continuing with the description of the operation of processor 10, an understanding of how binary words are generated and stored within RAMs 15 through 21 to cause the desired operation is essential.

TABLE 1

| 0 | 000000 | M | 011001 |
|---|--------|---|--------|
| 1 | 000001 | N | 011010 |
| 2 | 000010 | O | 011011 |
| 3 | 000011 | P | 011100 |
| 4 | 000100 | Q | 011101 |
| 5 | 000101 | R | 011110 |
| 6 | 000110 | S | 011111 |
| 7 | 000111 | T | 100000 |
| 8 | 001000 | U | 100001 |
| 9 | 001001 | V | 100010 |
| Delimiter | 001100 | W | 100011 |
| A | 001101 | X | 100100 |
| B | 001110 | Y | 100101 |
| C | 001111 | Z | 100110 |
| D | 010000 | / | 100111 |
| E | 010001 | * | 101000 |
| F | 010010 | . | 101001 |
| G | 010011 | $ | 101010 |
| H | 010100 | ( | 101011 |
| I | 010101 | ) | 101100 |
| J | 010110 | ¦ | 101101 |
| K | 010111 | ½ | 101110 |
| L | 011000 | % | 101111 |

Looking at Table 1 immediately hereinabove, therein is shown one possible list of forty-six alpha-numeric and other characters to be searched for within messages stored within memory 12. This list is not inclusive and any conceivable character, including exemplary characters of Cyrillic, Chinese or Hebrew alphabets may be searched for. All that is necessary is that whatever character that is to be searched for be assigned a binary number. Advantageously, these binary numbers are one digit increments as shown in Table 1. Using six bit binary numbers will allow sixty-four different characters to be searched for as is recognized by one skilled in the art. If more than sixty-four characters are required to be searched for, a seven bit binary number may be utilized which will yield one hundred twenty-eight binary number combinations. As characters of messages ae read out of memory 12 to be checked, it is the binary numbers representing these characters that are being input in parallel format to the six lower-order address bits A2 of each of RAMs 15 through 21 and 25 through 28 of processor 10 as shown in FIGS. 1 and 2. Address inputs A1 and A2 of RAMs 15 through 21 and 25 through 28 are all connected in parallel as shown. Therefore, a single address is applied to all these RAMs. The total of 12 addressing bits A1 and A2 of RAMs 15 through 21 and 25 through 28 address the 4096 bits of memory within each of these RAMs. There is only one output bit from each of RAMs 15 through 20 which are combined in a parallel format to make up a six-bit binary word which is input to buffer register 22 to be temporarily stored therein. It is the six-bit binary number temporarily stored in register 22 that is applied to the six higher order address bits A1 of RAMs 15 through 21 and 25 through 28 as shown. Similarly, RAMs 25 through 28 provide a four-bit binary word which is input to and stored in register 29 and also applied to lower order addressing input A4 of RAM 30. The contents of register 29 are applied to the higher order addressing input A3 of RAM 30 for the next received character.

Thus, binary words read out of RAMs 15 through 21 are looped back to the higher order addressing inputs A1 making these RAMs content addressable and thereby operating in an associative fashion.

TABLE 2

| Character | Address A1 | Address A2 | Memory Location | Memory Contents | Last RAM |
|-----------|-----------|-----------|-----------------|-----------------|----------|
| Delimiter | 000000 | 001100 | 12 | 000001 | 0 |
| F | 000001 | 010010 | 82 | 000010 | 0 |
| 1 | 000010 | 000001 | 129 | 000011 | 0 |
| 1 | 000011 | 000001 | 193 | 000100 | 0 |
| 6 | 000100 | 000110 | 262 | 110000 | 0 |
| Delimiter | 110000 | 001100 | 12 | 000001 | 1 |
| F | 000001 | 010010 | 82 | 000010 | 0 |
| 5 | 000010 | 000101 | 133 | 000011 | 0 |
| E | 000011 | 010001 | 209 | 110000 | 0 |
| Delimiter | 110000 | 001100 | 12 | 000001 | 1 |
| E | 000001 | 010001 | 81 | 000010 | 0 |
| C | 000010 | 001111 | 143 | 000011 | 0 |
| M | 000011 | 011001 | 217 | 000101 | 0 |
| 6 | 000101 | 000110 | 326 | 110000 | 0 |
| Delimiter | 110000 | 001100 | 12 | 000001 | 1 |
| F | 000001 | 010010 | 82 | 000010 | 0 |
| 4 | 000010 | 000100 | 132 | 000100 | 0 |
| M | 000100 | 011001 | 281 | 110000 | 0 |
| Delimiter | 110000 | 001100 | 12 | 000001 | 1 |

The binary words written into selected memory locations of RAMs 15 through 21 by microprocessor 14 are the six-bit binary numbers shown in the Memory Contents column of Table 2. It should be noted that these six bit binary numbers are generally simple one-digit increments of one from the other. Each of these binary words stored in RAMs 15 through 20 and sequentially read out as the characters of each keyword are detected and are then applied to the higher order addressing inputs A1 of all RAMs except RAM 30 via register 22. Being applied to the higher order addressing inputs A1, each of these six-bit binary words will identify a block of sixty-four memory bits in each RAM. Thus, the six-bit binary word read out of one block of memory bits will identify the next block of sixty-four memory bits due to the content addressable operation.

It should be noted that upon the last character of each keyword being input to processor 10, the binary word 110000 is read out of RAMs 15 through 20 which causes the processor to go to the block of memory bits identified by that binary word to check for a subsequent delimiter character before providing a one output from RAM 21. This assures that an erroneous word such as F11645 does not cause a one output from RAM 21 only upon the receipt of the first four characters.

As just described, the six higher order addressing bits designate blocks of sixty-four bits in each of RAMs 15 through 21 and 25 through 28. Thus, when address A1 is 000000, RAM memory locations 0 through 63 are addressed; when the A1 address is 000001 RAM memory locations 64 through 127 are addressed; when the A1 address is 000010 locations 128 through 191 are addressed; when the A1 address is 000011 locations 192 through 255 are addressed; when the A1 address is 000100 locations 256 through 319 are addressed, and so on. This block orientation is reflected in Tables 3 and 4 immediately herebelow.

TABLE 3

| Memory Block | | 1 | 2 | 3 | 4 | 5 | 6 | 7 | 8 | 9 | 10 |
|---|---|---|---|---|---|---|---|---|---|---|---|
| Bits | 0 | 63 | 127 | 191 | 255 | 319 | 383 | 447 | 511 | 575 | 631 |
| D | | | | | | | | | | | |
| E | | F | 1 | 1 | 6 | | | | | | |
| L | | | | | | | | | | | |
| I | | F | 5 | | | E | | | | | |
| M | | | | | | | | | | | |
| I | | F | 4 | | | | M | | | | |
| T | | | | | | | | | | | |
| E | | E | | | | | | | C | M | 6 |
| R | | | | | | | | | | | |

TABLE 4

| Memory Block | | 1 | 2 | 3 | 4 | 5 | 6 |
|---|---|---|---|---|---|---|---|
| Bits | 0 | 63 | 127 | 191 | 255 | 319 | 383 |
| D | | | | | | | |
| E | | F | 1 | 1 | 6 | | |
| L | | | | | | | |
| I | | | | | | | |
| M | | F | 5 | E | | | |
| I | | | | | | | |
| T | | F | 4 | | M | | |
| E | | | | | | | |
| R | | E | C | M | | | 6 |

Tables 3 and 4 reflect the keywords F116, F5E, F4M and ECM6 to be searched for in each message read out of memory 12 in FIG. 1. In an earlier processor of mine which is disclosed in U.S. patent application Ser No. 015,278 filed Feb. 26, 1979, and entitled "Data Driven Processor," the processor comprised only that hardware shown in FIG. 1. This application is incorporated herein by reference. Table 3 reflects the amount of memory in RAMs 15 through 21 required to search for the above listed four keywords. Ten blocks of sixty-four memory bits totalling six hundred forty memory bits were required. With my previous processor this amount of memory was required in order that only the specified keywords would be recognized. To attempt the density of memory usage achieved with the present invention in my earlier processor would yield erroneous outputs for false keywords such as F516, EfE6, etc.

With the present invention which requires the addition of the circuitry shown in FIG. 2, the same four keywords listed in the first sentence of the last paragraph may be detected in messages without false keyword detection. The increased density usage of RAMs 15 through 21 is reflected in Table 4 above. Only six memory blocks totalling three hundred eighty-four memory bits are required. This is a savings of four memory blocks totalling two hundred fifty-six memory bits for the example of the four keywords listed above. A large savings in the amount of memory required to search for keywords may be realized for other multiplicity of keywords. In this manner RAMs of a given number of memory bits may be utilized to search for many more keywords utilizing the teaching of the present invention.

Figure 4:
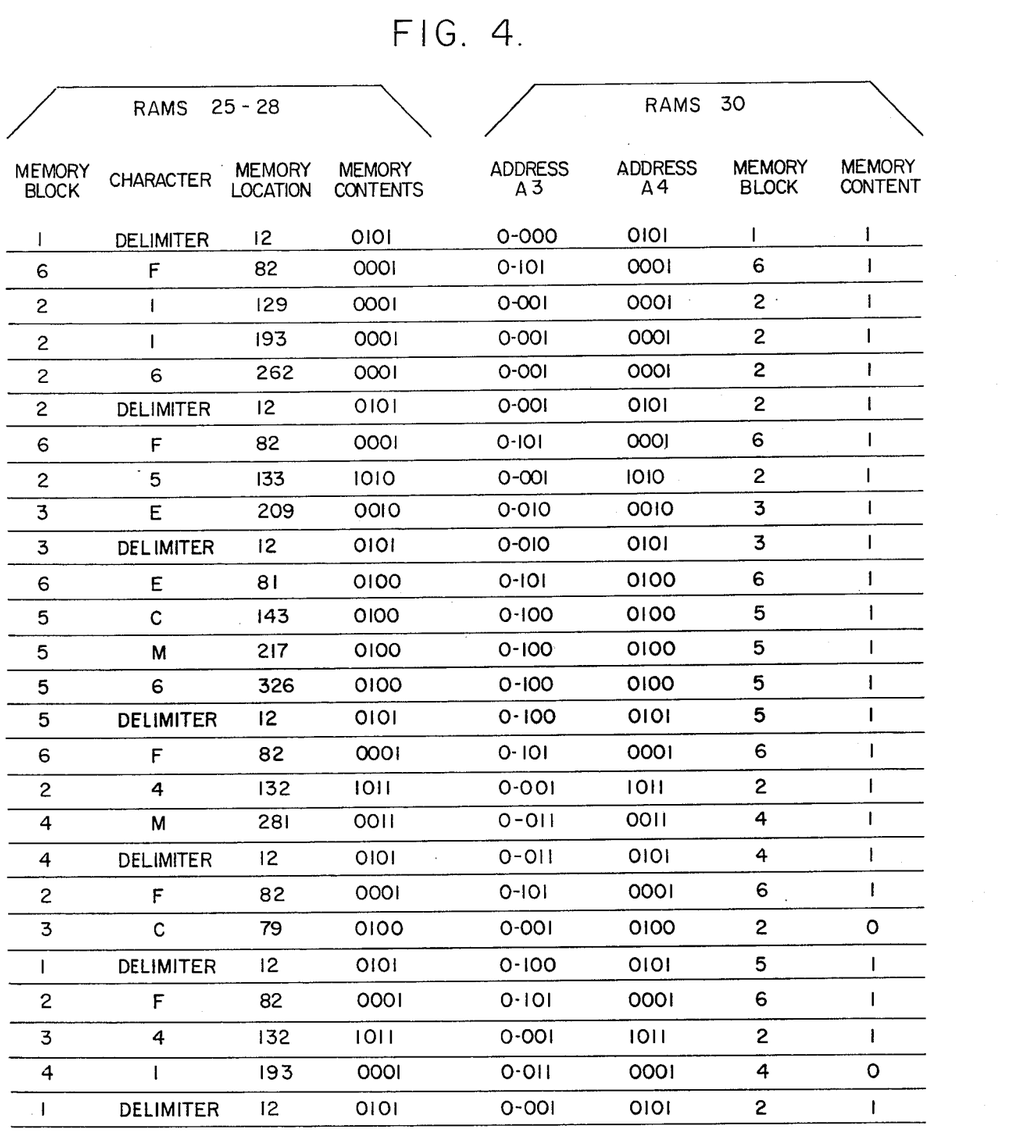
FIG. 4 is a table used to explain the operation of my novel processor.

I turn now to describe the operation of the processor shown in FIGS. 1 and 2 in searching for the keywords F116, F5E, F4M and ECM6. The tables shown in Table 2 and FIG. 4 are required in conjunction with the following description to understand the operation. The operation of the circuitry shown in FIG. 1 is first described to understand the basic operation of the processor. Thereafter, further in this specification, the operation of the circuitry shown in FIG. 2 is described to understand how the circuitry therein permits greater keyword density as reflected between Tables 3 and 4.

Referring to Table 2, a delimiter character must first be searched for and in the first memory block bits 0 through 63. As shown in Table 1, the delimiter character is represented by the binary word 001100 which, in a manner well known in the art, has a decimal value of twelve. That is derived from adding up a number associated with each "one" in the twelve-bit address binary word with the lowest order binary bit having a value of 1, the next highest order bit having a value of 2, the third higher order bit having a value of 4 and so on through the values 8, 16, 32, 64 etc. Thus, the two "ones" in the binary word 001100 for the delimiter have the values 4 and 8 which are summed to get 12. Since memory bits are numbered starting with zero, the eleventh memory bit in each of RAMs 15 through 21 and 25 through 28 of the first block of sixty-four bits are designated by the delimiter character binary word 001100.

As shown in Table 3, the first alpha-numeric character of each of the four keywords, the letters E and F, are associated with the second block of sixty-four bits in RAMs 15 through 21 and 25 through 28. The letter E is represented by the binary word 010001 and the letter F is represented by the binary word 010010 as shown in Table 1. With the previously described numerical weighting technique, the numbers 1 and 16 are added together to get 17 and this in turn summed with 64 from the higher order Address A1 to get 81 for the letter E. Similarly, the letter F yields 82. Memory location 81 is within the second memory block of sixty-four bits and is the only bit therein associated with the letter E. Memory bit location 82 will be for the letter F, location 83 for the letter G, location 84 for the letter H and so on.

With the generally sequential binary numbers under the Address A1 column of Table 2 and with the binary numbers assigned to each character as shown in Table 1, it can be seen that it is a relatively easy task to program microprocessor 14 to write the sequential binary numbers of Address A1 in the appropriate bits of each block of sixty-four bits of the RAMs 15 through 21 and 25 through 28. Within each block of memory there is a bit assigned to each of the characters in Table 1. As the A1 addresses are generally sequential binary words as mentioned previously, blocks of memory are generally sequentially addressed by the outputs from the RAM memory which are the sequential binary words. When a particular block of memory bits is reached in each of RAMs 15 through 20 and 25 through 28, only the bit(s) associated with the next keyword character or characters to be received can possibly have a "1" written therein to make up a binary word or zeros and ones. All other bits must all be zeros.

There are only two restrictions to the general outline of RAM memory operation described above that are reflected in Table 4. The same alpha-numeric or other character in more than one keyword cannot be in the same block or memory bits in the RAMs. Thus, as shown in Table 4, the letter "M" found in the keywords F4M and ECM6 cannot both utilize memory bit block four. Thus, the "M" of the keyword F4M utilizes block 5. The same thing applies to the number 6 in ⌞ne keywords F116 and ECM6. This first restriction is easy to observe as reflected in Table 4. When the "4" of the keyword F4M is checked, the one hundred thirty-first memory bit in the third block of memory bits in each of RAMs 15 through 21 is read out yielding the six bit binary word 000100 which indicates the fifth block of memory bits rather than the fourth block of memory bits, as reflected in Table 4, to be the block of memory bits to be used to determine if the character "M" immediately follows the sequential receipt of the characters "F4". Thus, in Table 2, the binary numbers under the Memory Contents column opposite "4" and "M" of F4M are not sequential binary numbers. Similarly, there is not a sequential binary number read out responsive to the letter "M" in the keyword ECM6.

The second restriction is that branches must be accomplished associated with one block of memory bits. That is, when two or more keywords have common initial characters, the first non-common characters must use the same block of memory bits for the branch. Per Table 4, the letter "F" is the common first character of three keywords and this "F" for the three keywords must be searched for in a common block of memory bits; in this example block two as shown in Table 4. Likewise, the branch characters "1", "5" and "4" following the letter "F" must use the same block or memory so that they may be searched for simultaneously; in this example block three as shown in Table 4.

For example, with reference to Table 2, after the receipt of the letter F in the keyword F5E, the binary word 000010 is read out of RAMs 15 through 20 and is stored in register 22 and then applied to the higher order addressing inputs A1 of the RAMs 15 through 21 and 25 through 28. This binary word 000010 indicates the next or third block of memory bits within each of RAMs 15 through 21 and 25 through 28. Within the said next or third block of memory bits the specific bit associated with the character "5" of the keyword F5E is the bit in each of RAMs 15 through 20 which will store the binary word 000011 shown in Table 2. Specifically, in the specific bits associated with the character "5", in RAMs 15, 16, 17 and 18 are stored zeros while a "1" is written into the specific bit of RAMs 19 and 20. Thus, if the next binary word applied to lower order addressing inputs A2 of RAMs 15 through 21 is 000101, representing the number 5, the binary word 000011 is read out of RAMs 15 through 20. This binary word 000011 overwrites the previous 000010 contents of register 22 and is applied to the higher order addressing inputs A1 of RAMs 15 through 21. If any other character other than the characters "1", "4", "5" or "C" had been the next character received, the binary word 000000 would be read out of RAMs 15 through 20. As a result, the higher order addressing input A1 has a 000000 input thereto, as represented by the top entry of the address A1 column of Table 2, and processor 10 recommences looking for the delimiter character represented by the binary word 001100 being applied to the lower order addressing inputs A2 of RAMs 15 through 21. In this manner processor cycles back to look for a delimiter character in the event the exact sequence of characters in a keyword are not received. If the exact sequence of characters in a keyword are received, processor 10 provides an output indicating successful receipt of the keyword. This is described further in the specification.

In brief summary, microprocessor 14 causes the ordered binary numbers under the Memory Contents column of Table 2 to be written into specific bits of each block of bits of RAMs 15 through 20 in correspondence with the keyword to be detected. These ordered binary numbers are sequentially read out of RAMs 15 through 20 only when the designated keyword or keywords are read out of memory 12 and input to RAMs 15 through 20 of processor 10.

I now completely describe the operation of processor 10 programmed via microprocessor 14 to detect the keywords ECM6, an example shown in Table 2. Initially, the binary word 000000 is written into register 22 and thereby applied to the higher order addressing inputs A1 of RAMs 15 through 21 and 25 through 28. This is represented by the 000000 at the line of the Address A1 column of Table 2 opposite DELIMITER immediately above ECM6.

The processor must first detect a delimiter character represented by the binary word 001100 per Table 1 before any other characters can be checked to determine if they are part of a keyword. Accordingly, microprocessor 14 has written the binary word 000001 into the bits of RAMs 15 through 20 associated with the delimiter character in the first block of memory bits designated by the binary word 000000 at the Address A1 input of the RAMs. When the binary word 001100 for the delimiter character is applied to addressing inputs A2, the total of twelve binary bits under addressing column A1 and A2 identify memory location twelve within each of RAMs 15 through 21 and 25 through 28. In the memory location eleven (twelfth bit) of RAMs 15 through 20 is stored the six-bit binary number 000001 as is shown under the Memory Contents column of Table 2. In the eleventh memory location (twelfth bit) of RAM 21 is stored a zero as reflected under the LAST RAM column of Table 2. RAMs 15 through 19 all contain zeros at their twelfth bit while the twelfth bit of RAM 20 contains a one. The contents of RAMs 25 through 28 and their use is described further in this specification.

The six-bit binary number 000001 output in parallel format from RAMs 15 through 20 in response to the binary word 001100 for the delimiter character being applied to addressing inputs A2 of the these RAMs overwrites the previous 000000 contents of register 22 under the control of the clocking signal CLK applied thereto. This six-bit binary number 000001 in resister 22 is looped back around to become the new six-bit address applied to higher order address inputs A1 of RAMs 15 through 21 and 25 through 28.

As shown in Table 2 alongside the letter "E" of ECM6 the Address A1 bits are 000001 as described in the last paragraph. If the binary word for the next alpha-numeric or other character applied to the addressing input A2 of RAMs 15 through 21 and 25 through 28 is the binary word 010001 for the letter "E", the twelve-bit RAM address comprising addresses A1 and A2 on line two of Table 2 opposite the letter "E" of keyword ECM6 will read out memory location 82 in each of RAMs 15 through 21 and 25 through 28. In the second block of memory bits, indicated by the A1 address 000001, memory location 83 is the only other bit location that may have something written therein for the letter "F" of the other keywords. All other bits have zeros written therein. Location 81 has 000010 written therein as shown in Table 2. Last RAM 21 has a zero written therein also as reflected in Table 2.

The binary word 000010 read out of memory location 81 of RAMs 15 through 20 overwrites the previous contents of register 22 and is stored therein. This same binary number is applied via register 22 to the higher order addressing inputs A1 of RAMs 15 through 21 as reflected in Table 2 opposite the letter "C" of keyword ECM6. Upon the next received alphanumeric character being the letter "C" represented only by the binary number 001111 shown under the Address A2 column opposite the letter "C" of keyword ECM6, the twelve-bit address comprised of addresses A1 and A2 causes memory location 143 of RAMs 15 through 21 and 25 through 28 to be read out. The binary number 000011 is read out of RAMs 15 through 20 and overwrites the previous contents of register 22. In the third block of memory bits wherein bit 143 is utilized for the character "C" in the keyword ECM6, three other bits are also utilized to achieve the memory usage packing density achieved by the present invention. They are bits 129, 133 and 132 as reflected in the table of Table 2 for the characters in the same block as shown in Table 4. The circuitry in FIG. 2 prevents errors as described further in this specification.

The next character to be detected in the keyword ECM6 is the letter "M" which is represented by the binary word 011001. In the event the next character read out of memory 12 is other than the characters "M", "E" or "1", which are stored in the fourth block of memory bits as shown in Table 4, the output of RAMs 15 through 20 is the binary word 000000 which cycles processor 10 back to recommence looking for a delimiter character. The next character being the letter "M" represented by the binary word 011001 applied to lower order addressing inputs A2 causes the binary word 000101 to be read out of RAMs 15 through 20. If the binary word for the next character is for the letter "M", the equipment in FIG. 2 allows the binary number 000101 stored in memory location 217 to be registered in register 22. However, if the next character is either "1" or "E" the binary numbers stored in memory locations 193 and 201 respectively are read out of RAMs 15 through 20 but are prevented from being stored in register 22. The operation of the apparatus shown in FIG. 2 is described further in this specification.

Following detection of the character "M", the binary word 000101 read out of RAMs 15 through 20, placed in register 22 and is applied to the higher order A1 addressing inputs of the RAMs indicating that memory block 6 is to be used for determining the presence of the character "6" in the keyword ECM6. This is reflected in Table 4. Again, if the next character applied to the A2 addressing inputs of RAMs 15 through 21 and 25 through 28 is other than the character "6", the binary number 000000 is read out of RAMs 15 through 21 indicating to processor 10 that the full keyword ECM6 has not been received from memory 12 and processor 10 looks for the next delimiter character to check the message word received immediately thereafter. However, the receipt of the character "6", the last character in the keyword ECM6, causes the binary number 110000 to be read out of RAMs 15 through 20 to start processor 10 looking for a delimiter character at that memory location. At the same time a "1" is output from RAM 21 which indicates that a complete keyword has been detected. The apparatus in FIG. 2 indicates which of a plurality of keywords was detected in the message presently being read out of memory 12.

Processor 10 operates in a similar fashion in detecting the presence of the keywords F116, F5E and F4M in messages read out of memory 12.

To accomplish message transfer subsequent to the recognition of a keyword or keywords therein, the system operates in the following manner. As each message is read out of memory 12, it is transferred via memory interface 13 and stored in data buffer 23 at the same time as processor 10 checks for keywords. Memory interface 13 is responsive to messages read out of memory 12 and recognizes signals therein indicating the beginning of each message and the end of each message. When the end of a message is detected, there is a signal from memory interface 13 to one of the two inputs of AND gate 24. Prior to the end of each message read out of memory 12, RAM 21 may provide a "1" output indicating that a selected keyword has been detected in the message being read out of memory 12. In response to this "1" output from RAM 21, microprocessor 14 generates a signal to the other of the two inputs of AND gate 24. Therefore, at the end of a message in which a keyword or words have been detected there is an output from AND gate 24 to data buffer 23. Data buffer 23 responds to the output of AND gate 24 to transfer the complete message stored in data buffer 23 to video terminal 11 to be stored therein and displayed on operator command. The operator utilizing video terminal 11 may display the message that has been transferred to the terminal from buffer 23 to review the content of the message containing the keyword or words. The operator of terminal 11 may also utilize other equipment (not shown) adjunct to video terminals, such as page printers, to provide a hard copy output of messages containing keywords.

If there is no output from AND gate 24, at the end of each message data buffer 23 dumps the message stored therein rather than transferring it to interactive video terminal 11. Data buffer 23 then stores the subsequent message read out of memory 12.

TABLE 5

| | | | Limit Search 87-123 | | |
|---|---|---|---|---|---|
| A1 | A2 | Number | Memory Location | Memory Contents | Last RAM |
| 0000 | 0000-1001 | 0-9 | 0-9 | 0000 | 0 |
| | 1010-1110 | Unused | 10-14 | 0000 | 0 |
| | 1111 | Delimiter | 15 | 0001 | 0 |
| 0001 | 0000 | 0 | 16 | 0001 | 0 |
| | 0001 | 1 | 17 | 0100 | 0 |
| | 0010-0111 | 2-7 | 18-23 | 0000 | 0 |

TABLE 5-continued

| | | | Limit Search 87-123 | | |
|---|---|---|---|---|---|
| A1 | A2 | Number | Memory Location | Memory Contents | Last RAM |
| | 1000 | 8 | 24 | 0010 | 0 |
| | 1001 | 9 | 25 | 0011 | 0 |
| | 1010-1110 | Unused | 26-30 | 0000 | 0 |
| | 1111 | Delimiter | 31 | 0001 | 0 |
| 0010 | 0000-0110 | 0-6 | 32-38 | 0000 | 0 |
| | 0111-1001 | 7-9 | 39-41 | 0110 | 0 |
| | 1010-1110 | Unused | 42-46 | 0000 | 0 |
| | 1111 | Delimiter | 47 | 0001 | 0 |
| 0011 | 0000-1001 | 0-9 | 48-57 | 0110 | 0 |
| | 1010-1110 | Unused | 58-62 | 0000 | 0 |
| | 1111 | Delimiter | 63 | 0001 | 0 |
| 0100 | 0000-0001 | 0-1 | 64-65 | 0011 | 0 |
| | 0010 | 2 | 66 | 0101 | 0 |
| | 0011-1001 | 3-9 | 67-73 | 0000 | 0 |
| | 1010-1110 | Unused | 74-78 | 0000 | 0 |
| | 1111 | Delimiter | 79 | 0001 | 0 |
| 0101 | 0000-0011 | 0-3 | 80-83 | 0110 | 0 |
| | 0100-1001 | 4-9 | 84-89 | 0000 | 0 |
| | 1010-1110 | Unused | 122-126 | 0000 | 0 |
| | 1111 | Delimiter | 127 | 0001 | 0 |
| 0110 | 0000-1001 | 0-9 | 96-105 | 0000 | 0 |
| | 1010-1110 | Unused | 106-110 | 0000 | 0 |
| | 1111 | Delimiter | 111 | 0001 | 1 |

Another use of my novel processor is to perform limit searching. That is, it may be utilized to locate a number in a range between selected high and low limit numbers. An example is represented in Table 5 above which is now described. In the example shown in Table 5 the processor is used to locate any number between the numbers 87 and 123. In the operation of the processor the output of the RAM memory is stored in holding register 22 and is reapplied to addressing inputs A1 just as it was for the keyword search operation previously described.

In this application, however, only the numbers 0 through 9 and the delimiter character are required. Therefore, only four binary bits are necessary to represent these ten numbers and delimiter character. Accordingly, for the limit search example shown in Table 5, only four addressing bits are required for each of addressing inputs A1 and A2. This is a total of an eight-bit address to a RAM. Before starting the search, register 22 is cleared and has 0000 stored therein which is applied to addressing inputs A1 as shown in Table 5.

Initially, the processor must locate a delimiter character so that it knows that the next character/number input to processor 10 is the first digit of a number. Accordingly, the presence of a four-bit binary number between 0000 and 1001, representing the decimal characters 0 through 9, or the presence of non-utilized binary numbers 1010 through 1110 will both yield a 0000 output from the memory as shown under the Memory Contents column of Table 5. Upon the delimiter character represented by the binary word 1111 being applied to addressing input A2 of the RAMs, the fifteenth RAM memory location is addressed by the eight-bit address applied to addressing inputs A1 and A2 and the output from the RAMs is 0001 indicating that the delimiter character has been detected. This portion of the operation is identical to the keyword search operation.

After the detection of a delimiter character, the processor is only looking for a number, the first digit of which is obviously only 8, 9 or 1, and wishes to ignore the digits 2 through 7 as well as the unassigned binary numbers and the delimiter character. This is accomplished in the following manner. The 0001 output from the memory in response to the delimiter character is applied to the A1 addressing input of all the RAMs which therefore continue looking for a first digit. From Table 5 it will be noted that in response to the next digit applied to the A2 addressing of the RAMs being two through seven or an unassigned binary code, that the output of RAM memory locations 18 through 23 and 26 through 30 is 0000 which causes the processor to cycle back and look for another delimiter character. A zero input digit following the delimiter character yields a 0001 output leaving the processor to look at the next input digit rather than for a delimiter character. In this manner, the presence of zeros prefixing a number are ignored. A second delimiter character will also yield a 0001 output which allows the system to continue looking for a number. Thus, when other than the digits 0, 1, 8 or 9 or the delimiter character are the first character or number detected, the 0000 output from the RAMs and applied to the A1 addressing inputs causes the processor to look for the next delimiter character and ignore any subsequent numbers as they cannot possibly fall within the limits of 87 through 123.

In response to the first digit following a delimiter character being a decimal one digit, the output of the seventeenth memory location is the four-bit binary number 0100 indicating the fifth block of memory bits which is used to search for the second digit following a one-digit. This binary number is applied via the holding register to addressing input A1 as previously described and indicated in Table 5. Logically it is recognized that the next digit that may be recognized following a one-digit in order to fall in the range of 87 to 123 must either be a zero, one or two. The binary word for the decimal numbers 0 and 1 are applied to the addressing input A2 and, in combination with the binary number 0100 being applied to addressing input A1, memory locations 64 and 65 are respectively read out to get the binary number 0011, which identifies the block of memory used to search for the third digit to be received. The binary word 0010 for the decimal number two being applied to addressing inputs A2 causes the binary word 0101 to be read out of memory location 66. The numbers 3 through 9 cannot occur after the number one within the limits of 87 to 123 and, if one of them are the next received digit, the binary number 0000 is output from memory locations 67 to 73 respectively as is shown in Table 5. Similarly, unassigned or unused binary words applied to addressing inputs A2 cause memory locations 74 through 78 to be read out and yield a 0000 output. As mentioned previously, this causes the processor to ignore any further numbers and it recommences looking for a delimiter character because there is a 0000 applied to addressing inputs A1. A delimiter character as the second character/number yields a 0001 output from memory which causes the processor to again look for the numbers 0, 1, 8 and 9 utilizing the second block of memory bits.

As is apparent, when the second digit is zero or one following a first digit of 1, the third digit will be anything from zero to nine for three digit numbers within the search limits of 87 to 123. Accordingly, the binary number 0011 read out of memory locations 64 and 65 in response to the second digits of zero or one following a first digit of one, indicates the fourth block of memory bits, as reflected in Table 5, which is used to search for a third digit of zero through nine. Thus, upon the appearance of a third digit of zero through nine the binary number 0110 is read out of memory locations 48 through 57 whereas binary number 0000 is read out of memory locations 58 through 62 for the unused binary codes and binary number 0001 is read out for the delimiter character code. The binary number 0110 is thereafter applied to higher order addressing inputs A1 as previously described and indicates the block of memory bits used to detect a delimiter character following a valid digit sequence between the limits of 87 to 123.

The detection of a delimiter character following any number between 100 and 119 just described above results in the binary number 0001 being read out of memory location 111 of RAMs 15 through 20. This addresses the second block of memory bits and the processor can then look for a valid number 0, 8, 9 or 1 of another number being input to processor 10 for limit searching. At the same time as a delimiter character is detected at the end of a number within the limits of 87 to 123, memory location 111 of RAM 21 also provides a one output indicating the number just checked falls within the limits of 87 to 123.

If instead a fourth digit, not a delimiter character, is input to processor 10, one of memory locations 96 to 105 read out yielding a 0000 binary number which causes the processor to recommence looking for a delimiter character as a number has just been received that is not within the specified search limits.

Had the second digit been a two, following a first digit of one, memory location 66 is addressed and binary word 0101 is read out therefrom. Binary word 0101 addresses another block of memory used only to search for a third digit of zero through three for the numbers 120 to 123 being searched. Upon a third digit of zero to three being detected, one of memory locations 80 to 83 is read out yielding the binary number 0110 which indicates the memory block used to detect the next digit being a delimiter character as previously described.

Upon the first digit received after a delimiter character being the number 8, the binary number 0010 is output from the RAMs and applied to the A1 addressing inputs thereof via register 22. The 0010 input identifies the third block of memory bits in the RAM memory which is used to search for a second digit of seven through nine. In the third block of memory, bits 32 through 38 have 0000 written therein as a second digit of zero through six cannot fall within the search limits. Memory bits 39 through 41 respectively corresponding to allowable second digits 7 through 9 have the binary number 1000 written therein which causes the processor to look for the next character to be the delimiter character before providing a last RAM output indicating the number just received is within the specified limits. Upon the second digit being a delimiter character, a 0001 is read out of memory location 47 which causes the processor to recommence looking for a first digit of 0, 8, 9 or 1 as previously described.

Similarly, upon the first digit being received following a delimiter character being the number 9, the binary number 0011 is output from memory location 25 of the RAMs and applied to the A1 addressing inputs thereof via the register. The 0011 input identifies the fourth memory block wherein bits 48 through 57 all have the binary number 0110 written therein, indicating receipt of a number between 90 and 99, and causes the processor to look for the delimiter character before providing an indication that the number just received is within the specified limits of 87 to 123.

Turning now to describe the operation of the circuitry shown in FIG. 2.

The use of the circuitry shown in FIG. 2 permits higher density usage of RAMs 15 through 20 by increasing the number of keywords that may be searched for with RAMs of a given bit size. This improvement was previously briefly described with reference to Tables 3 and 4 and is made possible with the circuitry shown in FIG. 2.

Initially, each keyword to be searched for is assigned an arbitrary binary identification code as shown in Table 6 immediately below. These identification codes each indicate a block of memory bits in RAM 30.

TABLE 6

| KEYWORDS | BINARY CODE IDENTIFICATION |
| --- | --- |
| Delimiter | 0101 |
| F116 | 0001 |
| F5E | 0010 |
| F4M | 0011 |
| ECM6 | 0100 |

These identification codes are written into RAMs 25 through 28 under control of microprocessor 14 in the manner now described and with reference to Table 6.

In memory location 12 of RAMs 25 through 28 in FIG. 1 is written the delimiter character identity code 0001, with zeros being written in memory bit 12 of RAMs 25 through 27 and with the one being written in memory bit 12 of RAM 28. Memory location 12 is used for the following reason. The addressing inputs of RAMs 15 through 21, as well as RAMs 25 through 28 are all connected in parallel so when one addresses location 12 in RAMs 15 through 21, one addresses RAMs 25 through 28 also. As may be seen in Table 2, the delimiter character always addresses memory location 12.

Turning to FIG. 4, therein is shown what is stored in RAMs 25 through 28 and 30 to provide the improved memory density described above with reference to Tables 3 and 4, while blocking erroneous keywords such as reflected in the examples at the bottom of FIG. 4.

As mentioned previously, RAMs 25 through 28 are of the same type as RAMs 15 through 21 and have the same number of addressing inputs, which inputs are connected in parallel with the addressing inputs of RAMs 15 through 21. Each time RAMs 25 through 28 are addressed a four-bit binary word is read out which is usually, but not always, one of the indentification codes shown in Table 6. The four-bit binary numbers read out of RAMs 25 through 28 are applied to the four-bit lower order addressing inputs A4 of RAM 30. At the same time the same four-bit binary number is input to register 29 which stores all but the highest order bit of the binary number. That is, if the four-bit binary number is 1101, only 101 is stored in register 29.

Higher order addressing input A3 of RAM 30 is also four bits, but the highest order bit thereof is connected so that it always has a zero applied thereto. The other three bits of input A3 have the three bits stored in register 29 applied thereto. Thus, the highest order bit of the eight addressing bits of RAM 30 is never applied thereto.

In operation, a four-bit binary number output from RAMs 25 through 28 is first applied to lower order addressing inputs A4 of RAM 30 while it is being input to register 29 to be stored therein. Due to the lag introduced by the operation time of register 29, this four-bit binary number is not applied to inputs A3 before RAM 30 is read out. However, the four-bit number read out of RAMs 25 through 28 at one moment in time is stored in register 29 in time to be the higher order address applied to input A3 of RAM 30 when the next four-bit binary number is read out of RAMs 25 through 28 and applied to input A4 of RAM 30.

A single bit addressed in RAM 30 only has a one written therein for each character of a valid character sequence of a keyword and is read out. RAM 30, along with RAMs 25 through 28 are loaded under control of microprocessor 14 in a manner similar to the loading of RAMs 15 through 21. A one read out of RAM 30 is applied via lead 31 to register 22 in FIG. 1, which enables register 22 to store whatever binary number is read out of RAMs 15 through 20 at the same time as a one is read out of RAM 30. A zero will be read out of RAM 30 in the event of non-valid character combinations as reflected at the bottom of FIG. 4. The circuitry of FIG. 2 thus prevents non-valid character combinations from being identified as keywords while allowing improved density of usage of RAMs 15 through 21. Without FIG. 2 such non-valid character combinations would provide a valid keyword indication with the memory packing density reflected in Table 4 versus the lesser density reflected in Table 3.

With an eight-bit address to RAM 30, the four higher order address bits can address a total of sixteen blocks each containing sixteen bits of memory. The binary word 0000 initially applied to higher order address inputs A3 addresses the first block of memory between and including bits 1-16. The binary code identification 0001 arbitrarily assigned to key word F116, when applied to inputs A3, addresses the second block of memory bits between and including bits 17-32. The binary code identification 0010 arbitrarily assigned to key word F5E, when applied to inputs A3, addresses the third block of memory bits between and including bits 33-48. The binary code identification 0011 arbitrarily assigned to key word F4M, when applied to inputs A3, addresses the fourth block of memory bits between and including bits 49-64. The binary code identification 0100 arbitrarily assigned to key word ECM6, when applied to inputs A3, addresses the fifth block of memory bits between and including bits 65-80. The binary code identification 0101 arbitrarily assigned to the delimiter character when applied to inputs A3, addresses the sixth block of memory bits between and including bits 81-96.

As mentioned previously, these binary code identifications are applied to lower order addressing inputs A4 prior to being stored in register 29 and immediately thereafter being applied to higher order addressing inputs A3 of RAM 30. When each of these four-bit binary code identifications is applied to lower order addressing inputs A4 of RAM 30, it selects one of the sixteen bits within a selected block of memory. It should be noted from Table 6 that the highest order bit of each of the arbitrarily assigned binary code identifications is a zero which means that these codes can only address the first eight bits within each block of memory. The second eight bits within each block of memory are used to distinguish between key words having common first characters as described in detail hereinafter.

Initially, a one is written into the fifth bit of each block of memory bits. That is, a one is written into bit 5 of the first block of memory, bit 21 within the second block of memory, bit 37 of the third block of memory and so on. This is done in order to detect delimiter characters between key words as will become more apparent as the operation of the circuitry in FIG. 2 is described in detail hereinafter.

In addition, the ones are written into the second through fifth block of memory bits, as is now detailed in order for RAM 30 to provide the memory packing density in RAMs 15-21 which is the subject of this invention. Within the second block of memory bits, bit 18 is identified by the eight bit address 0001 0001 has a one written therein. This falls within the first eight bits of the second block of memory bits which are arbitrarily assigned to key word F116. In the second eight bits of the second memory block, the bits identified by the lower order addresses 0101 and 1011 have ones written therein. Within the third block of memory bits the bit identified by the eight bit address 0010 0010 has a one written therein. The fourth block of memory bits arbitrarily assigned to key word F4M, has a one written in the bit location identified by the eight bit address 0011 0011. The fifth block of memory bits, arbitrarily assigned to key word ECM6, has a one written in the bit position identified by the eight-bit address 0100 0100.

With RAM 30 preliminarily having one written into the bit locations identified in the preceding paragraphs, RAM 30 is now ready to operate and provide the memory packing density function for RAMs 15-21 which is the subject of this invention.

Turning to FIG. 4, I now describe the functioning of the circuitry shown in FIG. 2 as the keywords F116, F5E, ECM6 and F4M are received in that order followed by two non-valid character combination. The two non-valid character combination examples are utilized to demonstrate how the circuitry of FIG. 2 will reject such combinations.

Associative processor 10 shown in FIGS. 1 and 2 is initially prepared to detect the aforementioned keywords by loading RAMs 15 through 21 via microprocessor 14 as shown in Table 2. When loading RAMs 25 through 28, there are two basic rules that must be observed that are reflected in Table 4. First, all keywords starting with a common character or characters must have the first non-common character in the same block of memory bits. In the present example, keywords F116, F4M and F5E all have a common first character, the letter "F". Second, with regards to characters other than the first characters of keywords, the same character appearing in more than one keyboard cannot appear in the same block of memory bits. These two rules result in the keywords F116, F5E and F4M all having their first character, the letter "F", in memory block 2 as shown in Table 4 and FIG. 4. The second characters of these keywords 1, 4, 5 are the first non-common characters and must all be written in the same block of memory; memory block 3 as shown in Table 4 and FIG. 4. Secondly, the letter "M" in keywords F4M and ECM6 do not both appear in memory bit block 4. In Table 4 the "M" in F4M is assigned to block 5 while the "M" in ECM6 is assigned to block 4, but these may be reversed. The choice of arbitrary as long as the rule is observed. The only result of this rule is that the binary word read out of RAMs 15 through 20 when the character "4" of keyword F4M is addressed is incremented by two rather than being incremented by one. The same thing applies when the character "M" of keyword ECM6 is read out.

Next, an arbitrary assumption must be made in loading RAMs 25 through 28 and 30. Upon the detection of the character "F", which is found in three keywords, we make the assumption that a specific one of the three keywords starting with the character "F" is being received. If the assumption is wrong, the system thereafter corrects itself. In this example, any keyword beginning with the character "F" is initially assumed to be the keyword F116.

Turning now to FIG. 2, after RAMs 25 through 28 and 30 are loaded via microprocessor 14 as shown in FIG. 4 under the Memory Contents columns, register 29 is initially set to contain the binary word 000. This results in the four higher addressing inputs A3 of RAM 30 being all zeros. This causes the first block of memory bits in RAM 30 to be addressed. As mentioned previously, the highest order bit of RAM 30 permanently has a zero input thereto and only three bits, rather than the four bits output from RAMs 25 through 28, are output from register 29 to the second, third and fourth highest order addressing bits of addressing input A3.

Upon the first character being applied to RAMs 25 through 28 being a delimiter character, the binary word identification code 0101, shown in Table 6, is read out of these RAMs and applied to the lower order addressing inputs A4 of RAM 30 as shown in the first line entry of FIG. 4. This results in the eight-bit address input to RAM 30 being 0-000 0001 which causes the second bit in the first memory block to be read out. This addressed bit in the first block of bits within RAM 30 is the only bit that has anything written therein and it has a "1" written therein which is read out and applied to register 22 in FIG. 1 via lead 31. The bits output from RAM 30 control the operation of register 22. As previously described, upon a delimiter character being input to RAMs 15 through 20 in FIG. 1, the binary word 000001 was read out of these RAMs and input to register 22. For a delimiter character RAM 30 outputs a 1 which, when applied to register 22, enables register 22 to store the binary word 000001. For any other "first" character the output from RAM 30 is a zero which causes whatever binary word was input to register 22 from RAMs 15 through 20 to be cleared and register 22 will still have a 000000 therein. This causes the system to respond only to a delimiter character.

After detection of a delimiter character, the system is prepared to receive and analyze the next received character. The 0001 binary word originally read out of RAMs 25 through 28 is now stored in register 29 as 101, the first or highest order bit have been dropped as mentioned previously. As the highest order bit of address inputs A3 of RAM 30 is permanently a zero, the A3 address input has the binary word 0-101 applied thereto which causes another or second block of memory bits in RAM 30 to be addressed. At this point it is still not known what character is to be received next and be processed to determine if it is a keyword. The keywords of FIG. 4 all start with the characters "E" or "F" and no other characters. If the next received character is a non-valid keyword character, a zero will be output from RAM 30 which will cause register 22 to be cleared to zero. If one of the characters "E" or "F" are the next received character, there is a one output from RAM 30 which allows register 22 to retain its content. This is reflected in FIG. 4 in that under higher order Address A3 column the binary word 0101 is found only opposite the characters "E" and "F". In FIG. 4 it is written as 0-101, however, to reflect the fact that the zero before the hyphen is the highest order bit "permanent" zero described previously, whereas the three digits following the hyphen come from register 29.

Upon the character "F" being the first character received following a delimiter character, it is arbitrarily assumed that the keyword F116 is being received as mentioned previously. Per Table 6 the identification code for keyword F116 is the binary number 0001. This binary word is what is read out of RAMs 25 through 28 upon receipt of the character "F" as shown in FIG. 4 adjacent to each appearance of the character "F" under the Memory Contents column. Upon the character "E" being the first character receiving following a delimiter character, the identification code 0100 shown in Table 6 for the keyword ECM6 is read out of RAMs 25 through 28. These identification codes are initially applied to the lower order addressing inputs A4 of RAM 30 as previously described and as shown in FIG. 4 opposite each appearance of the characters "E" and "F". Immediately thereafter, but before receipt of the next character, the code 0001 or 0100 is stored in register 29 as 001 or 100 respectively and becomes the higher order address bits applied to addressing inputs A3 of RAM 30. The binary numbers 0-001 and 0-100 identify the second and fifth blocks of memory bits within RAM 30, which blocks are associated with the keyboards F116 and ECM6 respectively.

Upon receipt of the digit "1" immediately following an "F", the binary identification code 0001 assigned to keyword F116 is again read out of RAMs 25 through 28. Thus, the eight-bit address to RAM 30 remains 0-001 0001 for the intermediate characters of keyword F116. If each received character is a valid character of keyword F116, there is a "1" output from RAM 30 for each character as shown in FIG. 4 which permits register 22 to keep its content and it along with RAMs 15 through 20 continue to check received characters. Upon receipt of the last character "6", it must then be determined that no other character other than the delimiter character is the next character received. Accordingly, the output from RAMs 25 through 28 in response to a delimiter character is 0101 rather than 0001. Binary word 0101 is the identify code shown in Table 6 for a delimiter character. Upon a delimiter character following the keyword F116, RAM 30 address 0-001 0101 yields a "1" output. The 0101 lower order address at this time becomes the 0-101 higher order address applied to address input A3 which recycles the system back to search for the character "E" or "F" as the next received character.

A similar operation is followed for the keyword ECM6 so it is not described in detail. In that instance, the identification code 0100 keeps recycling the circuitry through the block of memory bits in RAM 30 which it identifies and "1" outputs are provided to register 22 for each sequentially received character of keyword ECM6.

Turning now to the receipt of the keyword F5E. The delimiter character is received first followed by the character "F" and the circuit operation to this point is as previously described for keyword F116. It can be seen that a problem now arises. The identification code 0001 read out of RAMs 25 through 28 following receipt of the character "F" is for keyword F116 as per the assumption previously mentioned. The system must now correct itself as F5E is being received. To correct for the faulty assumption, the first or highest order bit of the binary word output from RAMs 25 through 28 in response to whatever character is received immediately following a common character must be a one. Thus, for the character "5" of keyword F5E the binary word 1010 is output from RAMs 25 through 28. This binary word is immediately applied to the lower order addressing inputs A4 and results in a one input from RAM 30 indicating that a valid character sequence has occurred. This permits RAM 30 to provide a one output for the second character of "5" and then steers further operation to the third block of memory bits, arbitrarily assigned to keyword F5E, to finish checking each sequentially received character of that keyword. However, the highest order bit of word 101, which is a one, is stripped away and the binary word 010 is stored in register 29. This is prefixed by the permanent zero to get the word 0-010 which is applied to the four-bit higher order addressing inputs A3 to address the third block of memory bits which is assigned to keyword F5E. As may be seen from Table 6, binary word 0100 is the identify code for keyword F5E. Thus, the first one bit of binary word 1100 permits correction of the assumption that any keyword starting with an "F" is keyword F116 but steers subsequent received digits to be checked by the third block of memory bits in RAM 30 assigned to keyword F5E which is identified by code 0100. This correction of assumption can also be seen in FIG. 4 for keyword F4M wherein binary word 1011 is read out of RAMs 25 through 28 upon receipt of the character "4" but the leading one is stripped away and replaced with a zero to get the binary word 0011 which is the identity code for keyword F4M. The binary code 0011 causes the fourth block of memory bits to be addressed and used to check characters of keyword F4M.

Upon a character appearing that is not a part of any keyword, or does not appear at a specific place in any keyword (i.e., the letter M does appear in the keywords ECM6 and F4M, but never appears as the second letter of any word), there will be a zero output from RAM 30 which causes register 22 to be cleared to zero indicating the character sequence is not that of a valid keyword. However, special precaution must be taken when a character of one keyword appears in proper numerical sequence in some other word being input to processor 10 for checking. Two examples, FC and F41 are shown in FIG. 4 and are described in detail.

In the exemplary non-valid character sequences FC and F41, the first character "F" is a valid character but must be followed by one of the characters "1", "4" or "5" which are all checked with the third memory block of RAMs 15 through 21 as shown in Table 4. However, the character "C" is also checked within this same block of memory and without the circuitry of FIG. 2 the exemplary non-valid character sequences FC and F41 would yield valid keyword outputs. This situation was created by the memory packing density introduced with the present invention. As may be seen in Table 3, the previous system comprising only the circuitry of FIG. 1 did not check for the character "C" in the third block of memory and thus, the problem did not arise. Other examples of non-valid character combinations to be blocked by that operation of the invention now described n E41, ECE6, FEM etc.

In operation, after being properly programmed, RAM 30 prevents the problem discussed in the last two paragraphs. Upon receipt of the character "F" immediately following a delimiter character register 29 has 001 stored therein and 0-001 is applied to addressing inputs A3 as previously described. Thus, the second block of memory bits, between and including bits 17 and 32 is addressed and is now used to detect if the next received digit is a "1", "4" or "5". As described previously, this second block of memory bits has ones written in only four bit locations. These are the bit locations wherein the four lower addressing bits applied to input A4 are 0001 to detect a "1", a 0101 to detect a delimiter character, a 1010 to detect a "5" and a 1011 to detect a "4". All other bit locations between and including bits 17 through 32 have zeros written therein. Therefore, a character immediately following "F" being a "C" causes 0100 to be read out of RAMs 25 through 28 which is applied to addressing inputs A4 and a zero is read out indicating the non-valid character sequence.

The operation of the circuitry in FIG. 2 in response to the sequential receipt of a delimiter character followed by the character "F" is exactly the same as previously described for the keyword F116, and a one is output from RAM 30 following each of these characters. Following receipt of the character "F", register 29 has the binary word 001 stored therein which causes the word 0-001 to be applied to higher order addressing inputs A3 of RAM 30. The system awaits the receipt of the next character at this time. Instead of a valid character 1, 4 or 5 being applied to RAMs 25 through 28, the character "C" is applied thereto which causes the binary word 0100 to be read out of RAMs 25 through 28. This binary word 0100 is applied to lower order address inputs A4 while the word 0-001 is being applied to the higher order address inputs A3. There is nothing stored in RAM 30 at the location identified by the address 0-001 0100 so a zero is read out of the RAM which properly clears register 22 to zero and thereby causes the processor 10 to search for a subsequent delimiter character.

Another problem now occurs in that the 0100 read out of RAMs 25 through 28 in response to the character "C" is now stored in register 29 and the higher order addressing inputs A3 have the number 0-100 applied thereto. Upon a delimiter character now being applied to the system, the bit in RAM 30 identified by address 0-100 0101 would have a zero therein if this and other locations had not already had a one written therein as previously described. Thus, we get a one output rather than a zero output from RAM 30 in response to a delimiter character following a non-valid character sequence which causes the system to now look for one of the valid characters "E" or "F".

Similarly, with respect to the character sequence F41, the circuitry of FIG. 2 responds to the sequential receipt of the characters Delimiter, "F" and "4" as described for valid keyword F4M to provide one outputs. At this point in the operation, input A3 has 0-011 applied thereto and then a one is input to the system which causes the total address to RAM 30 to be 0-011 0001. The result is that a zero is read out of RAM 30 causing the system to stop checking the particular character sequence and to recommence looking for a delimiter character. Other characters are ignored. At this point, iput A3 of RAM 30 now has 0-011 applied thereto and binary word 0101 is applied to inputs A4 upon receipt of a delimiter character. This is an address of 0-011 0101 which bit location has a one stored therein as previously described. Thus, there is a one output from RAM 30 to register 22 which allows the system to again look for a subsequent "E" or "F" character.

While that which has been described above is the preferred embodiment of the invention, it will be obvious to one skilled in the art that many variations may be made which are within the scope of my invention.

What I claim is:

1. Apparatus for processing binary information comprising a first memory having a first and a second section each of which are divided into blocks of memory bits in which are stored binary words, said stored binary words are read out of both said sections responsive to memory addressing information made up of binary words previously read out of said first memory section and binary bit codes within said binary information being processed, each of said binary bit codes respresenting a character; binary words are written into said first memory for each character of preselected character sequences being searched for within said binary information, and one binary word for more than one preselected character sequence can be stored in a common memory block, a first register for storing binary words read out of said first section of said first memory and then applying said stored binary words to addressing inputs of said first memory, and enabling means responsive to binary words read out of said section section of said first memory for enabling said first register to store a binary word read out of said first section only for the next character of a particular character sequence and not for any other character.

2. The invention in accordance with claim 1 wherein said enabling means comprises a second memory from which binary bits are read out responsive to said addressing information, said binary words read out of said second section of said first memory being applied to a first portion of addressing inputs of said second memory and the previous word read out of said second section of said first memory being applied to a second portion of said second memory addressing inputs, said binary bits read out of said second memory being applied to said first register to enable it to store binary words read out of said first section of said first memory only for the next character of said particular character sequence and not for any other character.

3. The invention in accordance with claim 2 wherein said enabling means further comprises a second register for storing binary words read out of said second section of said first memory and applying same to said second portion of said second memory addressing inputs, the contents of said second register being overwritten by subsequent binary words read out of said second section of said first memory.

4. The invention in accordance with claim 3 wherein said second register stores less than all the bits of the binary words read out of said second section of said first memory but the non-stored bits are applied to the first portion of said second memory addressing inputs and are used to distinguish between preselected character sequences having common characters or having character sequences identical with but less than all the characters in another preselected character sequence.

5. The invention in accordance with claim 3 wherein said binary information comprises messages that are to be checked with said processing apparatus to determine which of said messages contain preselected words or strings of words.

* * * * *